(12) United States Patent
Gaertner et al.

(10) Patent No.: US 8,823,979 B2
(45) Date of Patent: Sep. 2, 2014

(54) PSEUDO JOBS IN PRINT QUEUES FOR PRINT JOB SCHEDULING

(75) Inventors: Joseph P. Gaertner, Lafayette, CO (US); Joan Stagaman Goddard, Boulder, CO (US); Janeen E. Jahn, Lafayette, CO (US); Kumar V. Kadiyala, Boulder, CO (US); Marquis G. Waller, Beverly, OH (US)

(73) Assignee: Ricoh Company, Ltd, Tokyo (JP)

( * ) Notice: Subject to any disclaimer, the term of this patent is extended or adjusted under 35 U.S.C. 154(b) by 408 days.

(21) Appl. No.: 13/032,784

(22) Filed: Feb. 23, 2011

(65) Prior Publication Data
US 2012/0212769 A1   Aug. 23, 2012

(51) Int. Cl.
*G06F 3/12* (2006.01)

(52) U.S. Cl.
CPC .............. *G06F 3/126* (2013.01); *G06F 3/1205* (2013.01); *G06F 3/1253* (2013.01); *G06F 3/1288* (2013.01); *G06F 3/1204* (2013.01)
USPC ........................................ 358/1.15; 358/1.13

(58) Field of Classification Search
CPC ..... G06F 3/126; G06F 3/1262; G06F 3/1263; G06F 9/4881
USPC ................................ 358/1.14–1.16
See application file for complete search history.

(56) References Cited

U.S. PATENT DOCUMENTS

| 2004/0099166 A1* | 5/2004 | Blom et al. | 101/483 |
| 2008/0080003 A1* | 4/2008 | Ferlitsch et al. | 358/1.16 |
| 2008/0189693 A1* | 8/2008 | Pathak | 717/168 |
| 2010/0245890 A1* | 9/2010 | Chakraborty | 358/1.15 |

* cited by examiner

*Primary Examiner* — Marivelisse Santiago Cordero
*Assistant Examiner* — Kent Yip
(74) *Attorney, Agent, or Firm* — Duft Bornsen & Fettig, LLP

(57) ABSTRACT

Methods and systems are provided for scheduling multiple types of print jobs in a print queue using a pseudo job. A pseudo job is a special type of non-printing job object that is added to a print queue. In one embodiment, a system includes a print queue that stores print jobs scheduled for a printer. The print queue also stores a pseudo job that defines a boundary in the queue between print jobs having a first set of print settings and print jobs having a second set of print settings. In another embodiment, a system includes a print queue, a control system, and a graphical user interface. The graphical user interface displays options for generating a pseudo job, and receives input indicating a scheduled change to a configuration of a printer. The control system generates the pseudo job based on the input, and inserts the pseudo job in the print queue.

20 Claims, 12 Drawing Sheets

PSEUDO JOBS IN PRINT QUEUES FOR PRINT JOB SCHEDULING

FIELD OF THE INVENTION

The invention relates to the field of printing systems and, in particular, to the use of non-printing job objects in a print queue for a printer for scheduling print jobs for the printer.

BACKGROUND

Print shops are typically medium or large scale facilities capable of supplying printing services to meet a variety of customer demands. For example, print shops are often used to print documents used for mass-mailing (e.g., customer bills, advertisements, etc). Because print shops engage in printing on a scale that is hard to match, their customer base is usually varied. Print shop clients may therefore include both large institutional clients (e.g., credit card companies and banks), and small clients (e.g., small businesses and churches).

Print shops are generally arranged to print incoming jobs from clients in a way that is economical, yet fast. Thus, print shops often include a number of high-volume printers capable of printing incoming jobs quickly and at high quality. These printers may be managed by operators who can remove paper jams and reload the printers with media. Print shops also typically include post-print devices that are used to process the printed documents of each job (e.g., stackers, staplers, cutters, binders, etc.). Because print shops serve a variety of clients, they are often tasked with printing jobs that have varying printing formats, delivery dates, and media requirements. Print shops therefore often use a centralized print server that coordinates activity between printers of the print shop and clients. The print server schedules incoming jobs and forwards them to the printers they are directed to.

Clients with printing needs communicate with the print shop to send print jobs to a server. The server may then assign the print jobs to a print queue prior to printing the print jobs, or a print operator may assign the print jobs to the print queue. Typically, print jobs are assigned to a print queue based on a common set of print settings for the jobs in the queue. For example, print jobs for printing on A4 paper may be assigned to the same print queue. These jobs may be queued for printing on a printer loaded with A4 paper. In some cases, the print operator may wish to assign a print job to the print queue that has a different set of print settings than the other print jobs in the queue. For example, the print operator may wish to assign print jobs for printing on A4 paper to a queue for a printer loaded with letter paper. This type of assignment will fail because the print settings for the new job do not correspond with the print settings of the print jobs already in the print queue. This makes scheduling harder for the print operator.

SUMMARY

Embodiments described herein allow for scheduling multiple types of print jobs to the same print queue by storing a pseudo job in the queue. A pseudo job is a special type of non-printing job that is added to a print queue. The pseudo job may define a boundary in the print queue, such as a boundary between A4 print jobs and letter print jobs. For example, the print operator may schedule A4 print jobs to the print queue, add in a pseudo job to define a boundary in the print queue between A4 jobs and letter jobs, and schedule letter jobs after the pseudo job.

The pseudo job may also define a scheduled change to a configuration of a printer, such as scheduled change to media loaded at the printer for printing jobs, a scheduled change to a type of post-print activity available at the printer (stapling, binding, etc.), a type of toner available at the printer, a type of print engine available at the printer, and a type of firmware installed at the printer. For example, a print operator may schedule A4 print jobs to a print queue of the printer, add in a pseudo job to define a scheduled media change to letter paper at the printer, and schedule letter jobs after the pseudo job. Using pseudo jobs, a print operator has more flexibility in scheduling multiple types of print jobs for a printer.

In one embodiment, a system includes a print queue that stores print jobs scheduled for a printer. The print queue also stores a pseudo job that is a non-printing job object defining a boundary in the print queue between print jobs having different sets of print settings.

In another embodiment, a system includes a print queue, a control system, and a graphical user interface. The print queue stores print jobs scheduled for a printer. The graphical user interface displays an option for generating a pseudo job to a print operator, and receives input indicating a scheduled change to the configuration of the printer. The control system inserts the pseudo job in the print queue to represent the scheduled change to the configuration of the printer.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF THE EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
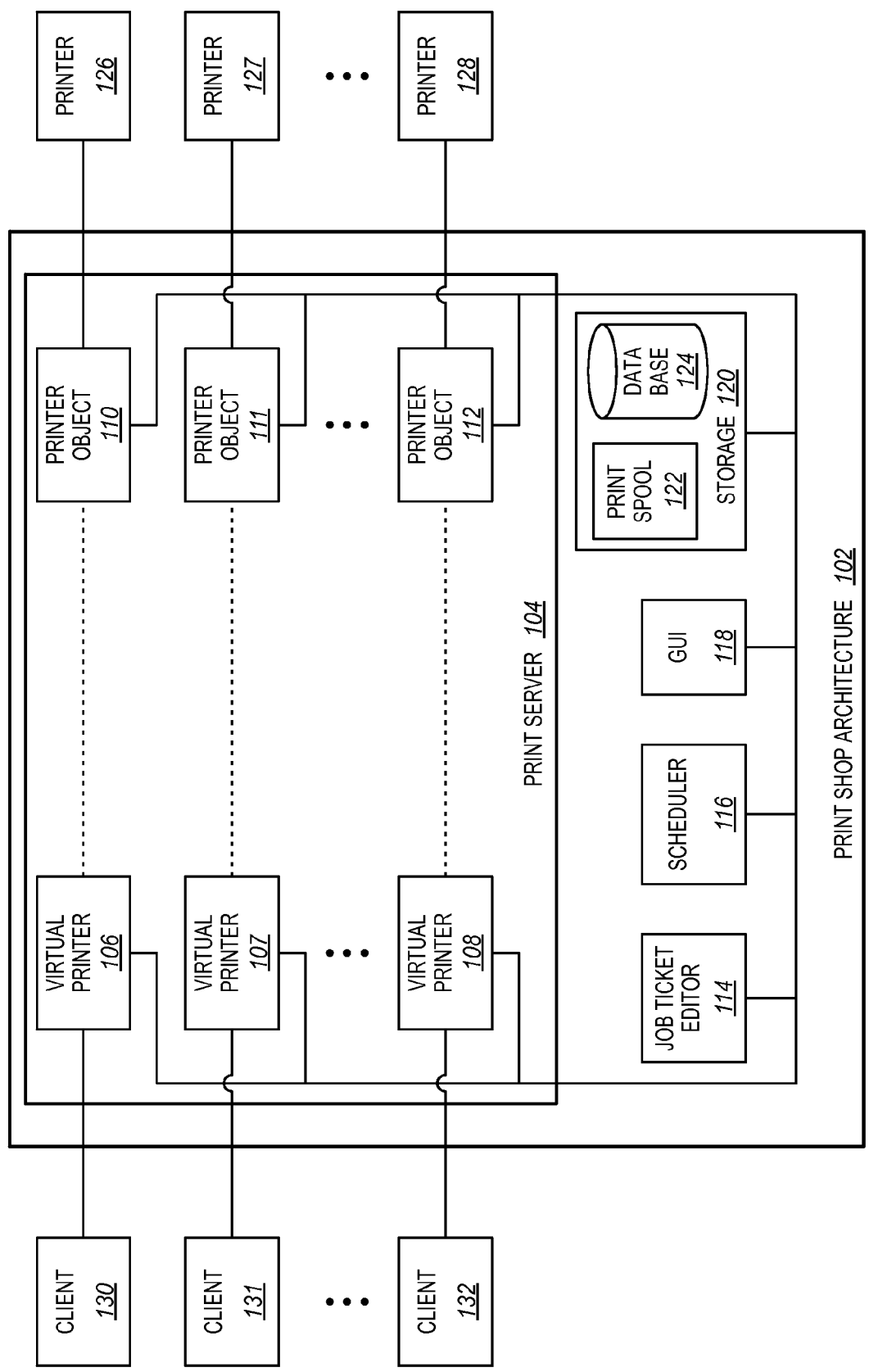
FIG. 1 is a block diagram illustrating a print shop architecture in an exemplary embodiment.

FIG. 1 is a block diagram illustrating a print shop architecture 102 in an exemplary embodiment. Architecture 102 couples one or more clients 130-132 to one or more printers 126-128 to provide printing and print workflow services to clients 130-132. Architecture 102 is operable to receive print jobs and job tickets from clients 130-132 for printing on printers 126-128. Clients 130-132 may include banks, credit card companies, or other entities with printing needs (e.g., monthly bank statements, monthly credit card bills, etc.) Architecture 102 may receive print jobs from clients 130-132 in a number of different formats, such as Portable Document Format (PDF), Mixed Object: Document Content Architecture (MO:DCA), etc. Job tickets may be received from clients 130-132 in a number of different formats, such as Job Definition Format (JDF), Print Production Format (PPF), Portable Job Ticket Format (PJTF), etc. Printers 126-128 generally include systems for transforming print data onto a suitable printable medium, such as paper, and generally are large production printing systems for high volume printing.

Architecture 102 includes a print server 104 having one or more virtual printers 106-108. Virtual printers 106-108 communicate with clients 130-132 and provide an interface similar to a printer driver to allow clients 130-132 to set up print jobs and send print jobs (and a job ticket associated with the print job) to architecture 102. When clients 130-132 send print jobs and job tickets to architecture 102, the job tickets are scanned into a database 124 located in storage 120 of architecture 102. The print jobs and job tickets are then stored in a print spool 122 of storage 120 as open jobs prior to queuing the print jobs for printing. A scheduler 116 identifies the open jobs located in print spool 122 and attempts to schedule the jobs at a queue of one or more printer objects 110-112. Typically, scheduler 116 attempts to schedule the open jobs at one of printer objects 110-112 corresponding with virtual printers 106-108 that received the print job. For example, if client 130 transmitted the print job to virtual printer 106, then scheduler 116 may first attempt to place the print job at a print queue of printer object 110. Generally, printer objects 110-112 interface with corresponding printers 126-128 to queue and process print jobs prior to transmitting the jobs to printers 126-128.

A print operator may use a Graphical User Interface (GUI) 118 of architecture 102 to control and identify the status of jobs at architecture 102. For example, GUI 118 may provide a list of print jobs in queues of printer objects 110-112 and other general information about the status of open jobs in print spool 122.

The print operator may also use a job ticket editor 114 to modify job tickets associated with both open and queued print jobs. Using job ticket editor 114, the print operator may modify job tickets to change various print options for a print job associated with the job ticket, such as duplexing, stapling, media type, etc. Architecture 102 provides a number of printing and workflow services to clients 130-132 which will become more readily apparent through the following discussion and related figures.

Figure 2:
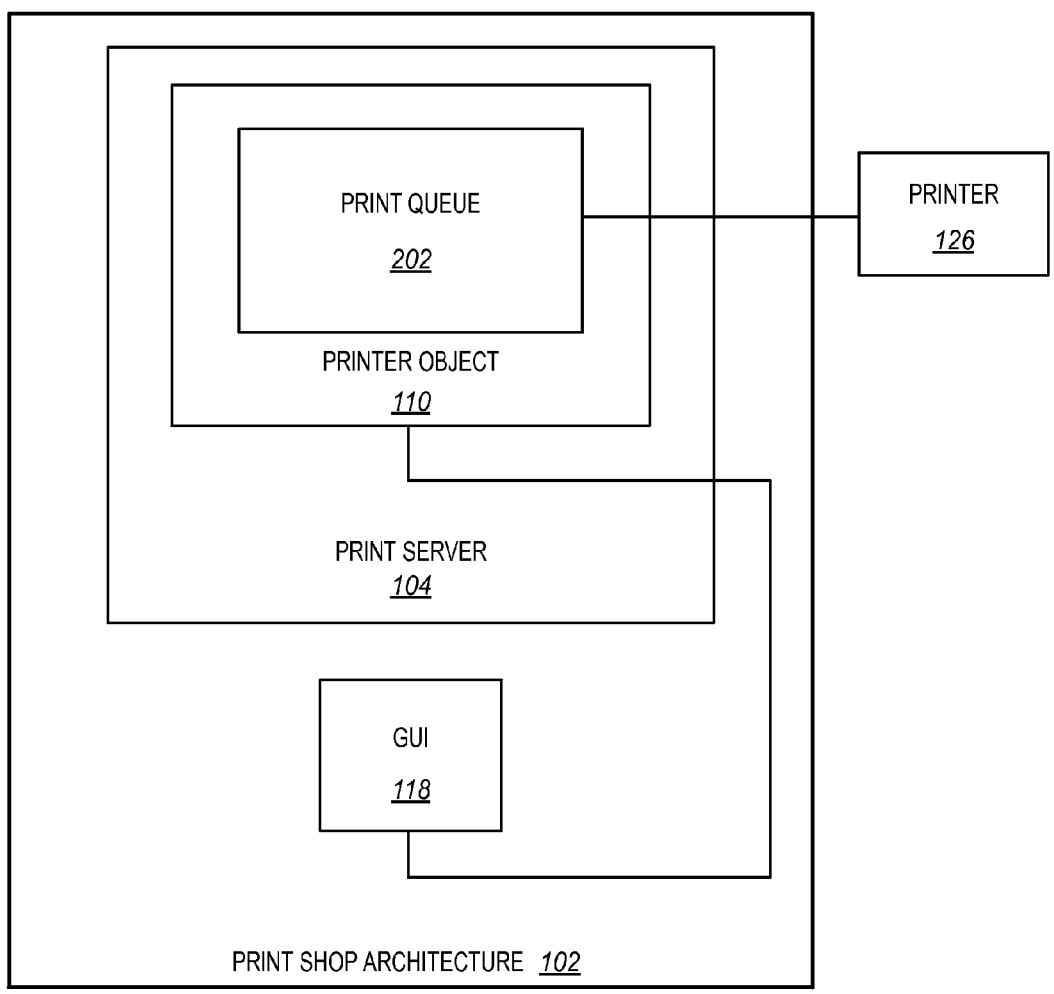
FIG. 2 is a block diagram illustrating additional details for the architecture of FIG. 1 in an exemplary embodiment.

FIG. 2 is a block diagram illustrating additional details for architecture 102 of FIG. 1 in an exemplary embodiment. In like manner to FIG. 1, architecture 102 of FIG. 2 includes print server 104 and GUI 118. Also illustrated in print server 104 is a print queue 202 operable to store one or more pseudo jobs and print jobs. A pseudo job defines a boundary in print queue 202 between print jobs having different sets of print settings, such as different types of media for printing the print jobs. A pseudo job does not have an actual print file or print data, but is a fake job indicating a change to the print settings of print jobs stored in print queue 202. For example, a pseudo job may define a boundary in print queue 202 between one set of print jobs having an A4 media type print setting and another set of print jobs having a letter media type print setting. Including a pseudo job in print queue 202 allows the print operator to schedule multiple types of print jobs to printer 126. How architecture 102 operates will be discussed in more detail with respect to FIG. 3-5.

Figure 3:
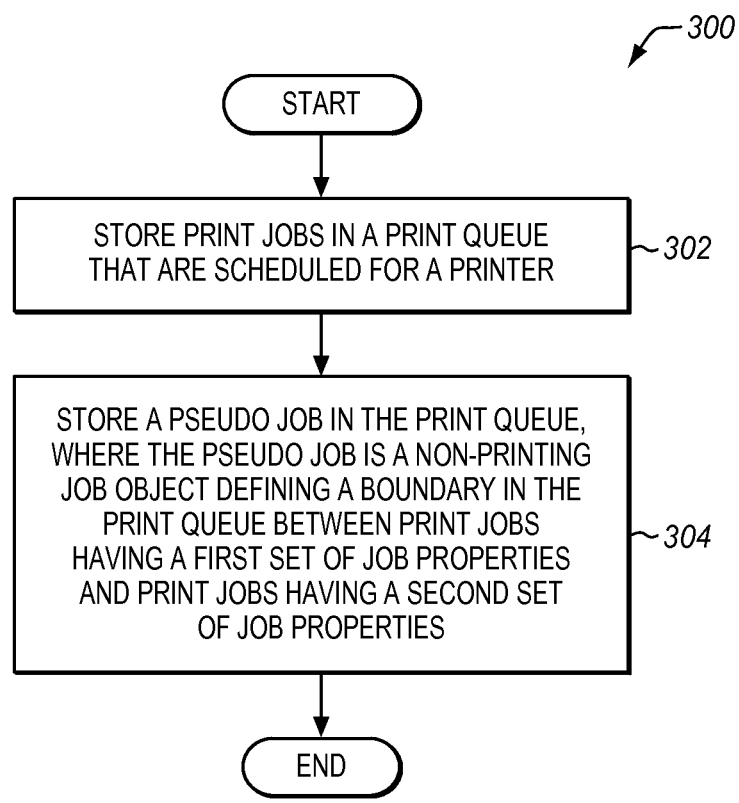
FIG. 3 is a flow chart illustrating a method of scheduling print jobs in a print queue with pseudo jobs in an exemplary embodiment.

FIG. 3 is a flow chart illustrating a method 300 of scheduling print jobs in a print queue with pseudo jobs in an exemplary embodiment. The steps of method 300 will be described with respect to architecture 102 of FIG. 2, although one skilled in the art will understand that method 300 may be performed by other systems not shown. The steps of method 300 described herein are not all inclusive and may include other steps not shown. The steps for the flow charts shown herein may also be performed in an alternative order.

Figure 4:
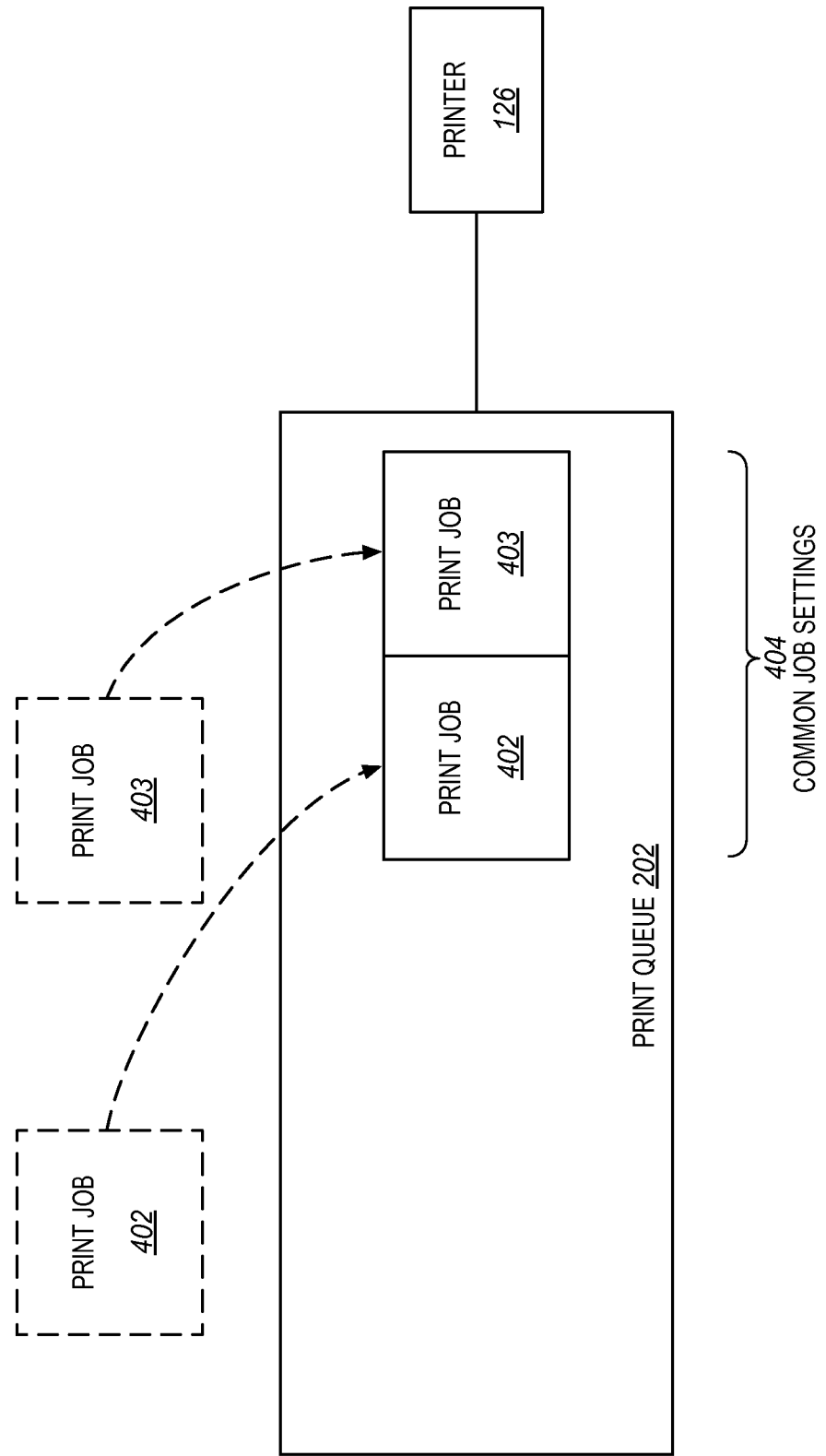
FIG. 4 is a block diagram illustrating a print queue that includes a pseudo job and print jobs in an exemplary embodiment.

In step 302, print jobs scheduled for a printer are stored in a print queue. FIG. 4 is a block diagram illustrating print jobs 402-403 scheduled for printer 126 stored in print queue 202. Print jobs 402-403 may be stored in print queue 202 by scheduler 116, shown in FIG. 1. Print jobs 402-403 that are stored in print queue 202 in this embodiment share a common set of print settings 404. The shared print settings may be a type of media (e.g., A4, letter, etc.) and/or a type of post-print action to perform on print jobs 402-403 (e.g., stapling, binding, etc.).

In some cases, it may be desirable to define a boundary in print queue 202 between print jobs that share print settings for scheduling different types of jobs for printer 126. For example, a print operator may wish to schedule print jobs 402-403 for printer 126 that have one set of print settings 404, and then schedule print jobs for printer 126 that have a different set of print settings. In some embodiments, a print operator may use GUI 118 (see FIG. 2) to create a pseudo job for print queue 202 to define a boundary in print queue 202 between print jobs 403-404 that have print settings 404, and print jobs that have different print settings. The print operator may enter information about the new boundary in print queue 202 between print jobs, such as how print settings for print jobs stored in print queue 202 in front of the pseudo job in print queue 202 are different than print settings for print jobs stored in print queue 202 behind the pseudo job.

Figure 5:
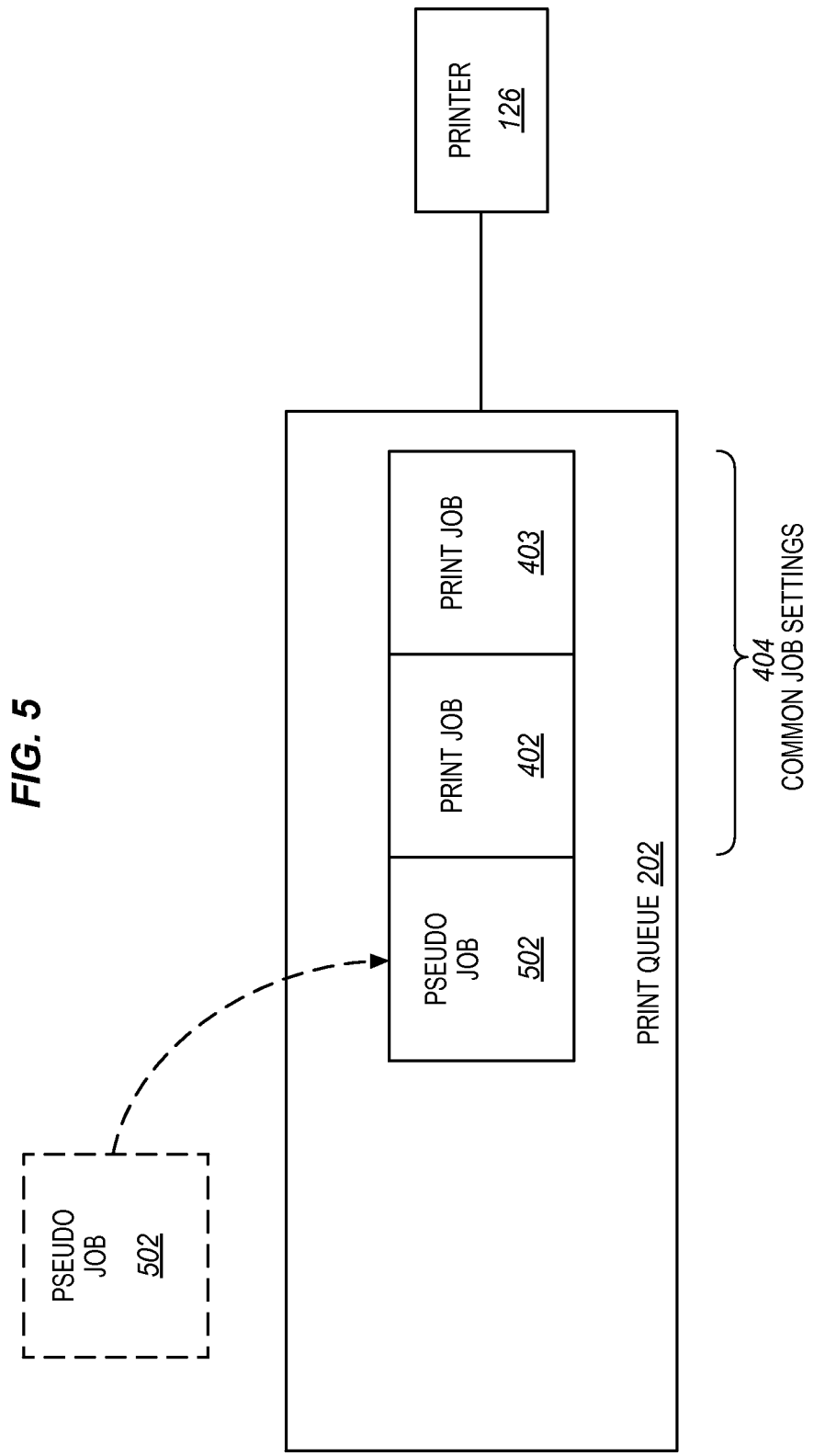
FIG. 5 is block diagram illustrating a print queue that includes a pseudo job and print jobs in an exemplary embodiment.

In step 304, a pseudo job is stored in print queue 202 to define a boundary in print queue 202 between print jobs having different sets of print settings. FIG. 5 is block diagram illustrating print queue 202 that includes a pseudo job 502 and print jobs 402-403 in an exemplary embodiment. Pseudo job 502 may be stored in print queue 202 by scheduler 116, shown in FIG. 1. When pseudo job 502 is added to print queue 202, it allows the scheduling of different types of print jobs for printer 126. In some embodiments, print queue 202 will not accept print jobs that have print settings that are different than a configuration of printer 126. This makes scheduling print jobs for printer 126 harder, but also prevents print jobs from being scheduled for printer 126 that printer 126 is not configured to print. For example, print jobs 402-403 may share A4 media type print settings, and pseudo job 502 may define a boundary in print queue 202 between A4 media type jobs and letter media type jobs. After pseudo job 502 is added to print queue 202, a letter media type job may be added to print queue 202 behind pseudo job 502.

Figure 6:
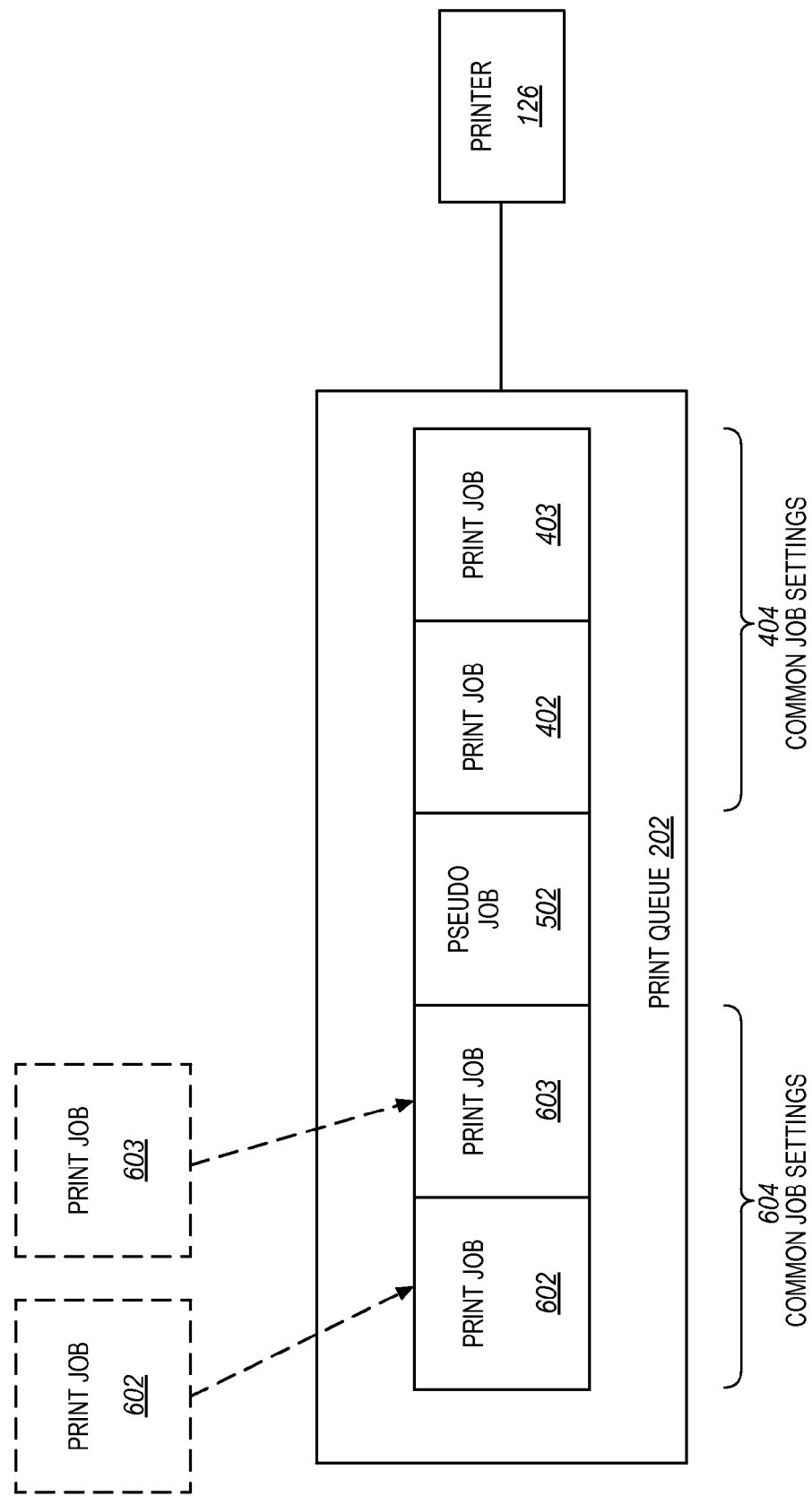
FIG. 6 is block diagram illustrating print queue that includes a pseudo job and additional print jobs in an exemplary embodiment.

FIG. 6 is block diagram illustrating print queue 202 that includes pseudo job 502, print jobs 402-403, and additional print jobs 602-603 in an exemplary embodiment. In the embodiment, print jobs 602-603 share common print settings 604. Also, print jobs 402-403 share print settings 404. In this embodiment, print settings 604 and 404 are different. In FIG. 6, pseudo job 502 defines a boundary in print queue 202 between print jobs 602-603 having print settings 604, and print jobs 402-403 having print settings 404. This allows the scheduling of different types of print jobs for printer 126 even though printer 126 may not be configured to print the print jobs. This makes scheduling print jobs for printer 126 easier.

Figure 7:
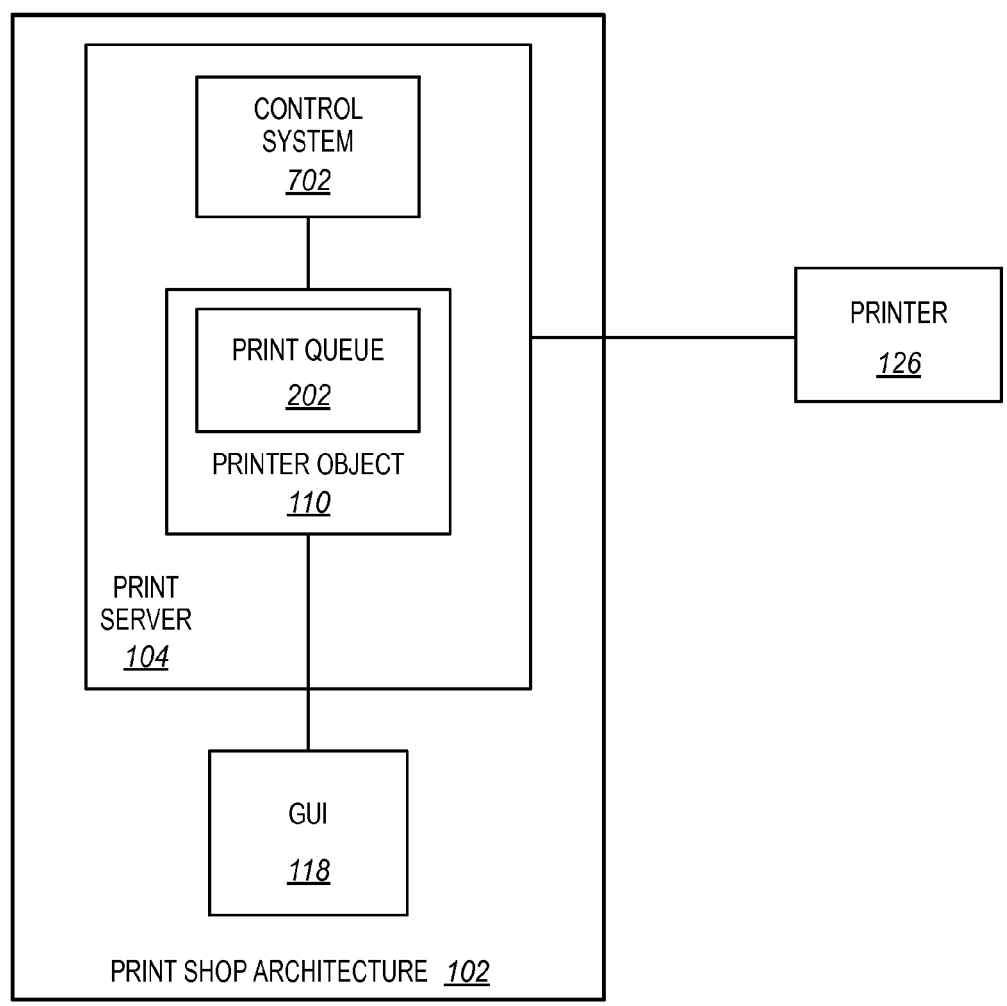
FIG. 7 is a block diagram illustrating additional details for FIG. 1 in another exemplary embodiment.

FIG. 7 is a block diagram illustrating additional details for architecture 102 of FIG. 1 in another exemplary embodiment. In like manner to FIG. 1, architecture 102 of FIG. 7 includes print server 104, and GUI 118. In this embodiment, printer server 104 includes a control system 702. Control system 702 comprises any component, system, or device that is operable to insert or store a pseudo jobs in print queue 202 that represent a scheduled change to the configuration of printer 126. A printer configuration does not necessarily encompass the entire capabilities of a printer, but instead reflects the current set up at the printer. A printer may have a wide variety of possible capabilities that are not currently configured. For example, a printer may be capable of printing on an A4 paper type, a letter paper type, a legal paper type, etc., but may currently be configured to print on A4 paper. A print operator may schedule A4 print jobs to print queue 202 of printer 126, add in a pseudo job to define a scheduled media change to letter paper at printer 126, and then schedule letter jobs after the pseudo job. Using pseudo jobs, a print operator has more flexibility in scheduling multiple types of print jobs for a printer. How control system 702 operates in this embodiment will be discussed in more detail with regards to FIGS. 8-11.

Figure 8:
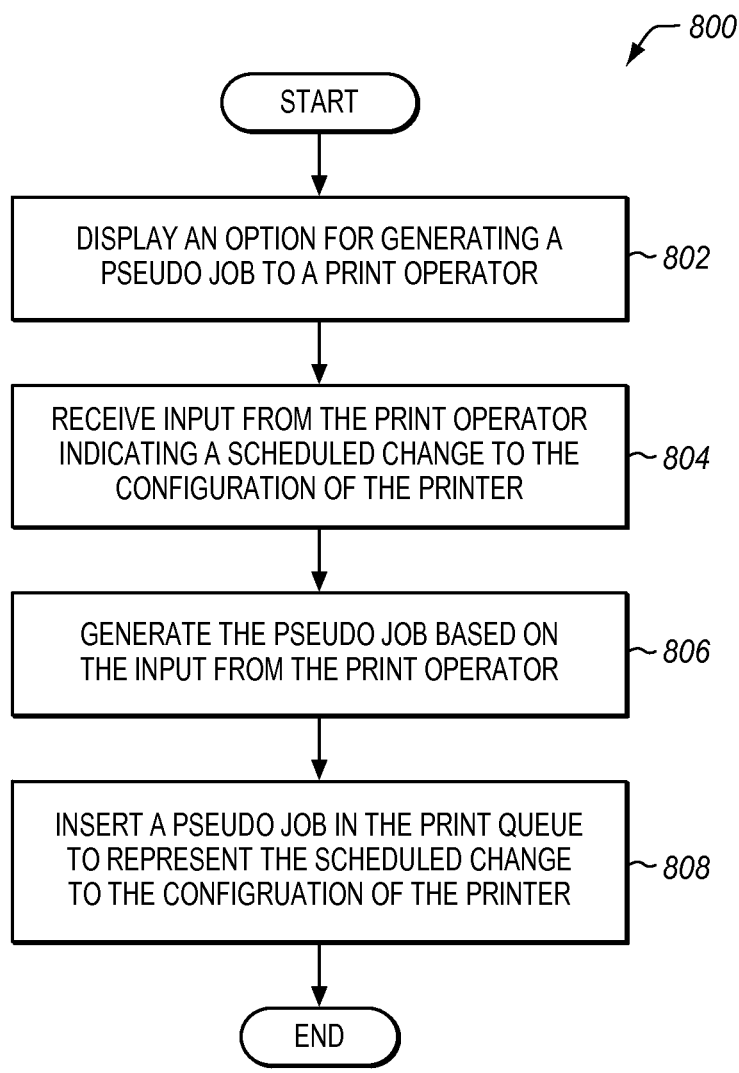
FIG. 8 is a flow chart illustrating another method of scheduling print jobs in a print queue with pseudo jobs in another exemplary embodiment.

FIG. 8 is a flow chart illustrating another method 800 of scheduling print jobs in a print queue with pseudo jobs in another exemplary embodiment. The steps of method 800 will be described with respect to architecture 102 of FIG. 7, although one skilled in the art will understand that method 800 may be performed by other systems not shown. The steps of method 800 described herein are not all inclusive and may include other steps not shown.

Figure 9:
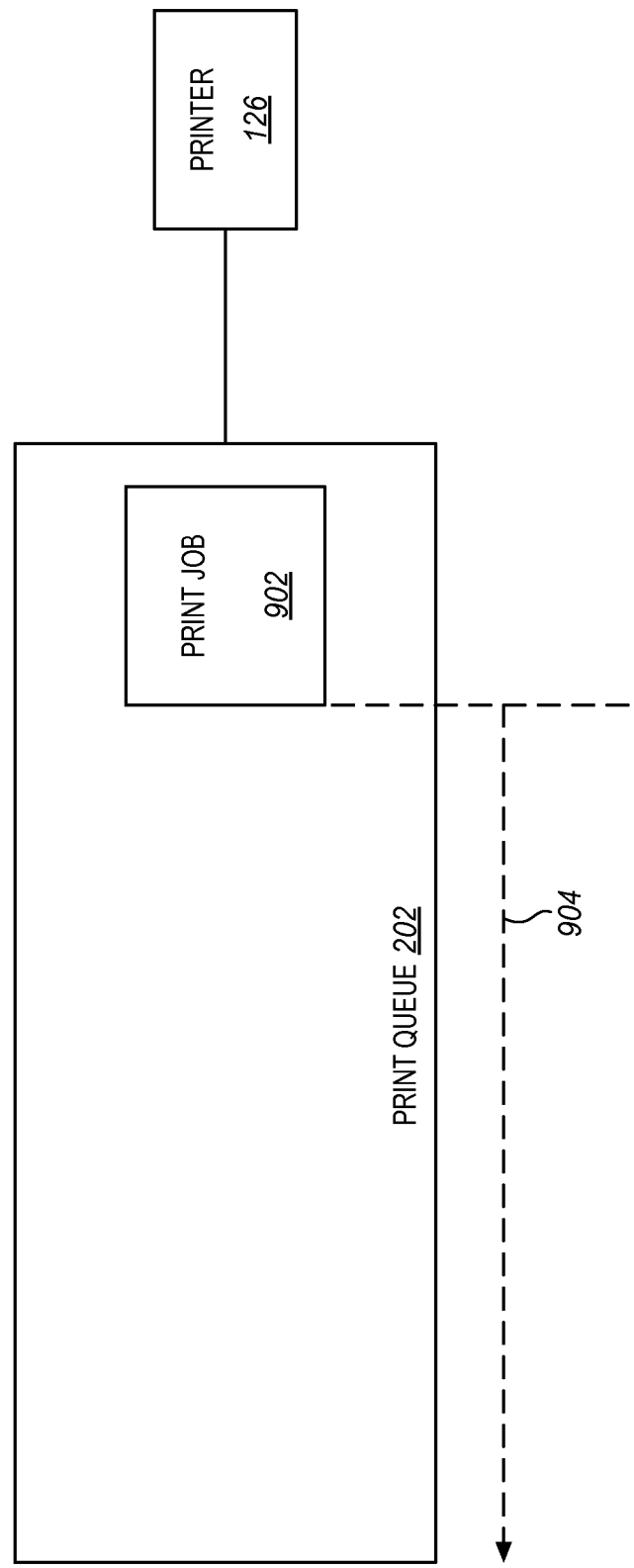
FIG. 9 is an example of a print job in print queue in an exemplary embodiment.

In step 802, GUI 118 displays an option to a print operator for generating a pseudo job. In this embodiment, pseudo jobs in print queue 202 represent scheduled changes to the configuration of printer 126. FIG. 9 is an example of a print job 902 in print queue 202 in an exemplary embodiment. In the embodiment, a current configuration of printer 126 corresponds with the print settings for print job 902. Locations 904 in print queue 202 illustrate how additional print jobs may be added to print queue 202 that also correspond with the current configuration of printer 126.

In step 804, GUI 118 receives input from the print operator indicating a scheduled change to the configuration of printer 126. In some cases, a print operator may desire to schedule print jobs for printer 126 that do not correspond with the current configuration of printer 126. For instance, printer 126 may be currently configured to print on letter paper. However, the print operator may desire to schedule an A4 job to printer 126. In this embodiment, print jobs may not be scheduled for printer 126 when printer 126 is not configured to print the print jobs. In step 804, the print operator enters information using GUI 118 on how the configuration of printer 126 is scheduled to change. For instance, in order to schedule an A4 job for printer 126, the print operator may indicate a scheduling change to the configuration of printer 126 to A4 paper.

In step 806, control system 702 generates the pseudo job based on the input from the print operator received in step 804. In this embodiment, the pseudo job is a special type of non-print job object that marks a position in print queue 202 indicating a scheduled change to the configuration of printer 126. In step 808, control system 702 inserts the pseudo job in print queue 202 to represent the scheduled change to the configuration of printer 126.

Figure 10:
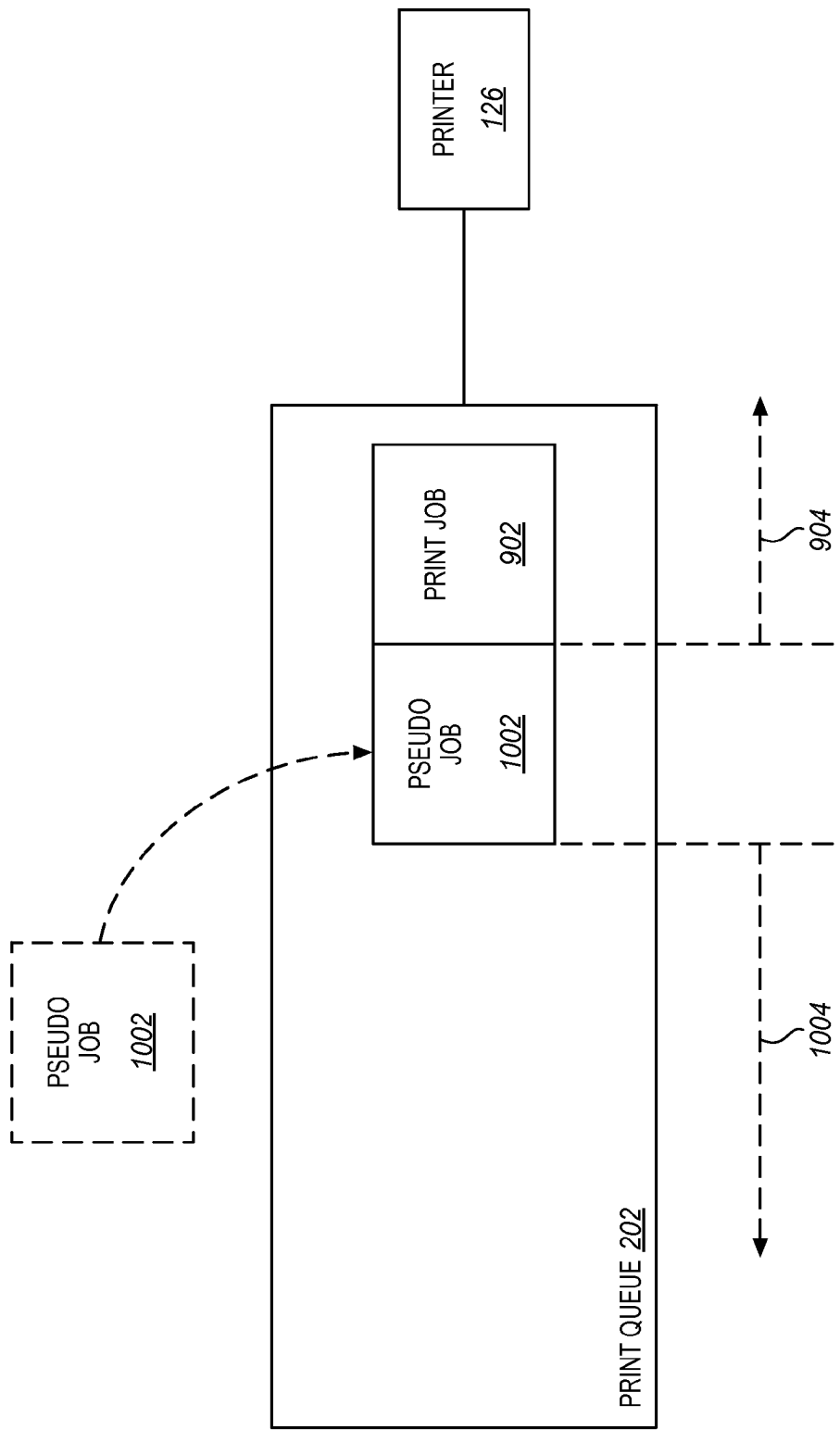
FIG. 10 is a block diagram illustrating a pseudo job inserted into a print queue to represent a scheduled change to the configuration of a printer in an exemplary embodiment.

FIG. 10 is a block diagram illustrating pseudo job 1002 inserted into print queue 202 to represent a scheduled change to the configuration of printer 126 in an exemplary embodiment. Locations 904 in print queue 202 indicate how the current configuration of printer 126 corresponds with the print settings for print job 902. Locations 1004 in print queue 202 indicate how the configuration for printer 126 changes due to the inclusion of pseudo job 1002 in print queue 202. The previous example discussed how a print operator may desire to schedule a print job for printer 126 that has print settings that do not match the current configuration of printer 126. In the example, the print operator desired to schedule an A4 job for printer 126 although printer 126 was not currently configured to print A4 jobs. As pseudo job 1002 in print queue 202 indicates a scheduled change to the configuration of printer 126, different types of print jobs may be scheduled for printer 126 in print queue 202 after pseudo job 1002.

Figure 11:
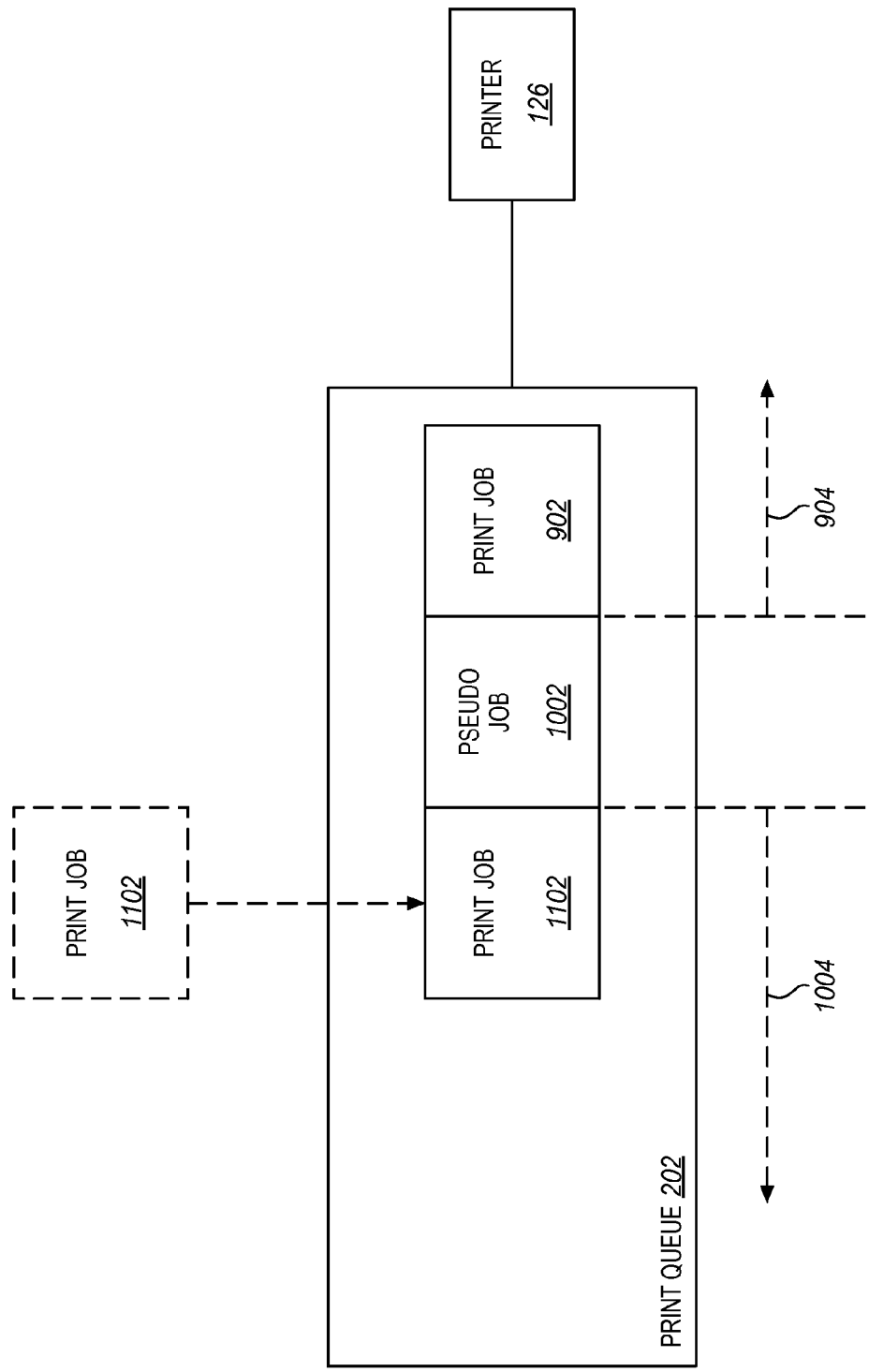
FIG. 11 is a block diagram illustrating how a different type of print job may be scheduled for a printer after a pseudo job is inserted in a print queue in an exemplary embodiment.

FIG. 11 is a block diagram illustrating how a different type of print job 1102 may be scheduled for printer 126 after pseudo job 1002 is inserted in print queue 202 in an exemplary embodiment. Locations 1004 in print queue 202 illustrate how additional print jobs may be added to print queue 202 that correspond with the scheduled configuration change indicated by pseudo job 1002. For example, if pseudo job 1002 indicates a change to A4 paper for printer 126, then A4 job may now be scheduled in print queue 202 after pseudo job 1002 within locations 1004 of print queue. This allows the scheduling of different types of print jobs for printer 126 even though printer 126 may not be currently configured to print the print jobs. This makes scheduling print jobs for printer 126 easier.

While printer 126 is printing jobs, the jobs are printed based on the order in which they are located within print queue 202. For example, a print job is considered to be at the "front" of print queue 202 when the job is either printing or next in line to print. A job that is considered to be at the "back" of print queue 202 when the job is last in line to print. Thus, as jobs in print queue 202 are printed, pseudo job 1002 and print job 1102 make their way towards the front of print queue 202.

As discussed previously, pseudo job 1002 indicates a change in the configuration for printer 126. Typically, the change in the configuration for printer 126 will include an operator action, such as loading different media on printer 126, changing, or adding an output tray, changing toner or print engine(s) installed at printer 126, etc. When pseudo job 1002 reaches the front of print queue 202 (e.g., after print job 903 removed from print queue 202 during the printing process), control system 702 may hold print job 1102 from printing in some embodiments Holding print job 1102 from printing allows the print operator to alter the configuration for printer 126 prior to printing print job 1102. In some cases, GUI 118 may display the configuration change information to the print operator to allow the operator to perform the action. For example, GUI 118 may display a dialog box indicating a change in the configuration for printer 126 from A4 to letter paper.

Before releasing print job 1102 for printing, control system 702 may wait for a confirmation that the operator action (i.e., the change to the configuration of printer 126) has been performed. The confirmation of the change in the printer configuration may be as simple as the print operator indicating so using GUI 118, or may include control system 702 receiving a confirmation from printer 126 indicating that the operator action has been performed. After the confirmation is received by control system 702, control system 702 releases print job 1102 for printing.

Figure 12:
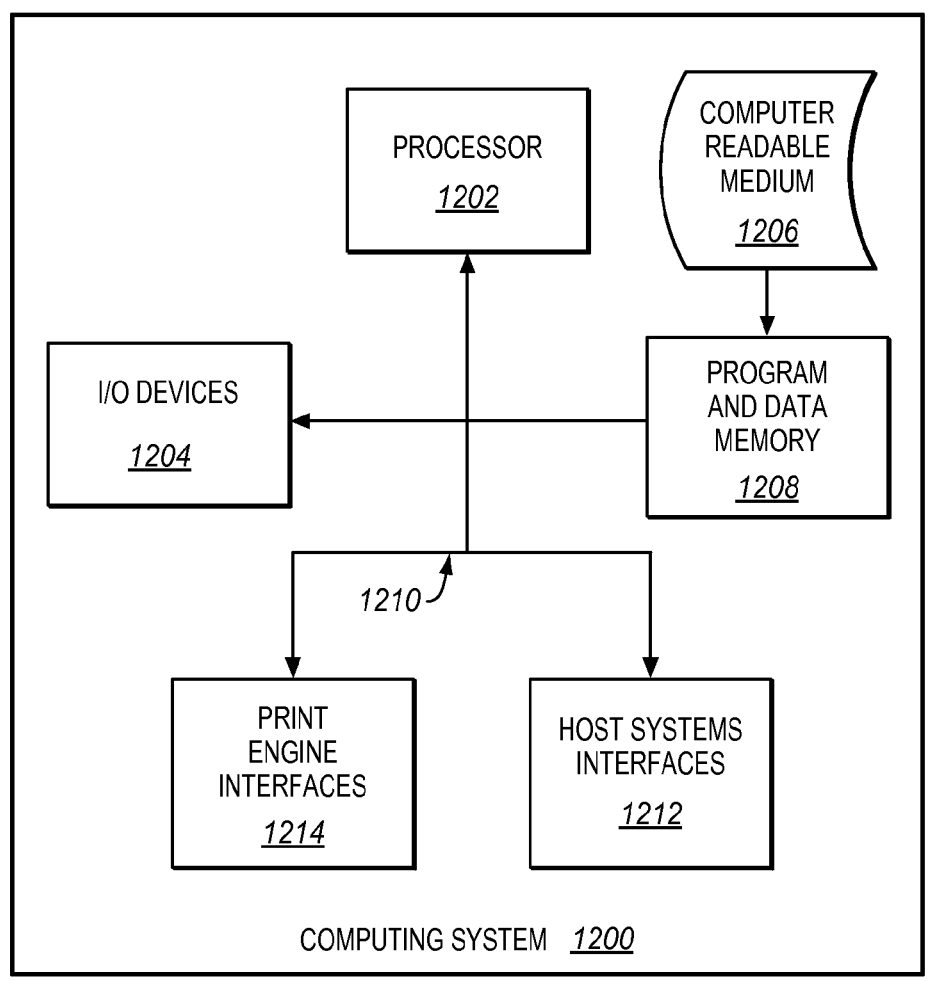
FIG. 12 illustrates a computer system operable to execute computer readable medium embodying programmed instructions to perform desired functions in an exemplary embodiment.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 12 illustrates a computing system 1200 in which a computer readable medium 1206 may provide instructions for performing methods 300 and 800 in an exemplary embodiment.

Furthermore, the invention can take the form of a computer program product accessible from a computer-usable or computer-readable medium 1206 providing program code for use by or in connection with a computer or any instruction execution system. For the purposes of this description, a computer-usable or computer readable medium 1206 can be any apparatus that can contain, store, communicate, propagate, or transport the program for use by or in connection with the instruction execution system, apparatus, or device.

The medium 1206 can be an electronic, magnetic, optical, electromagnetic, infrared, or semiconductor system (or apparatus or device) or a propagation medium. Examples of a computer-readable medium 1206 include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code includes at least one processor 1202 coupled directly or indirectly to memory 1208 through a system bus 1210. The memory 1208 can include local memory employed during actual execution of the program code, bulk storage, and cache memories which provide temporary storage of at least some program code in order to reduce the number of times code is retrieved from bulk storage during execution.

Input/output or I/O devices 1204 (including but not limited to keyboards, displays, pointing devices, etc.) can be coupled to the system either directly or through intervening I/O controllers.

Network adapters may also be coupled to the system to enable the data processing system to become coupled to other data processing systems, such a through host systems interfaces 1212, or remote printers or storage devices through intervening private or public networks, such as through print engine interfaces 1214. Modems, cable modem and Ethernet cards are just a few of the currently available types of network adapters.

Although specific embodiments were described herein, the scope of the invention is not limited to those specific embodiments. The scope of the invention is defined by the following claims and any equivalents thereof.

We claim:

1. A computer system comprising:
a processor and a memory that implement: a print queue operable to store print jobs scheduled for a printer, wherein the print queue is further operable to store pseudo jobs, which are non-printing job objects that define boundaries in the print queue between print jobs that request different configurations of a printer,
wherein the print queue will not allow a print job to be scheduled into a location within the queue if the print job requests a printer configuration that does not correspond with a configuration indicated by a pseudo job, wherein the pseudo-job is closer to the location than any other pseudo-jobs that precede the location.

2. The system of claim 1 wherein: the pseudo job defines a boundary in the print queue between print jobs having different media types.

3. The system of claim 1 wherein: the pseudo job defines a boundary in the print queue between print jobs having different post-print actions.

4. The system of claim 1 further comprising: a graphical user interface operable to display an option for generating a pseudo job to a print operator.

5. The system of claim 1 wherein: the pseudo job defines a scheduled change to a type of media loaded at the printer.

6. The system of claim 1 wherein: the pseudo job defines a scheduled change to a type of post-print action available at the printer.

7. The system of claim 1 wherein: the computer system is further operable to determine that the pseudo job is first in the print queue, and to hold print jobs in the queue following the pseudo job until a configuration of the printer has been changed as indicated by the pseudo job.

8. The system of claim 1 wherein: the computer system is further operable to receive a confirmation from the printer indicating that a printer configuration has been changed as indicated by the pseudo job, and to release print jobs in the queue following the pseudo job responsive to the confirmation.

9. The system of claim 1 further comprising: a graphical user interface operable to display a notification of a scheduled change to a configuration of the printer to a print operator, and to receive a confirmation from the print operator indicating that the configuration of the printer has been changed.

10. The system of claim 1 wherein: the pseudo job defines a scheduled change to a type of toner available at the printer.

11. The system of claim 1 wherein: the pseudo job defines a scheduled change to a type of print engine installed at the printer.

12. The system of claim 1 wherein: the pseudo job defines a scheduled change to a firmware installed at the printer.

13. A method comprising: storing print jobs in a print queue that are scheduled for a printer;
storing pseudo jobs in the print queue, wherein the pseudo jobs are non-printing job objects that define boundaries in the print queue between print jobs that request different configurations of a printer;
identifying a print job; and
preventing the print job from being scheduled into a location within the queue if the print job requests a printer configuration that does not correspond with a configuration indicated by a pseudo job, wherein the pseudo-job is closer to the location than any other pseudo-jobs that precede the location.

14. The method of claim 13 wherein: the pseudo job defines a boundary in the print queue between print jobs having different media types.

15. The method of claim 13 wherein: the pseudo job defines a boundary in the print queue between print jobs having different post-print actions.

16. The method of claim 13 further comprising: displaying an option for generating a pseudo job to a print operator.

17. A non-transitory computer readable medium embodying programmed instructions which, when executed by a processor, are operable for performing a method comprising:
- storing print jobs in a print queue that are scheduled for a printer;
- storing pseudo jobs in the print queue, wherein the pseudo jobs are non-printing job objects that define boundaries in the print queue between print jobs that request different configurations of a printer;
- identifying a print job; and
- preventing the print job from being scheduled into a location within the queue if the print job requests a printer configuration that does not correspond with a configuration indicated by a pseudo job, wherein the pseudo-job is closer to the location than any other pseudo-jobs that precede the location.

18. The medium of claim 17 wherein: the pseudo job defines a boundary in the print queue between print jobs having different media types.

19. The medium of claim 17 wherein: the pseudo job defines a boundary in the print queue between print jobs having different post-print actions.

20. The medium of claim 17, wherein the method further comprises: displaying an option for generating a pseudo job to a print operator.

* * * * *